Sept. 26, 1967     H. P. HALSEY     3,344,346

TRAMP METAL DETECTOR

Original Filed Nov. 7, 1963     3 Sheets-Sheet 2

INVENTOR.
HOMER P. HALSEY
BY
ATTORNEYS

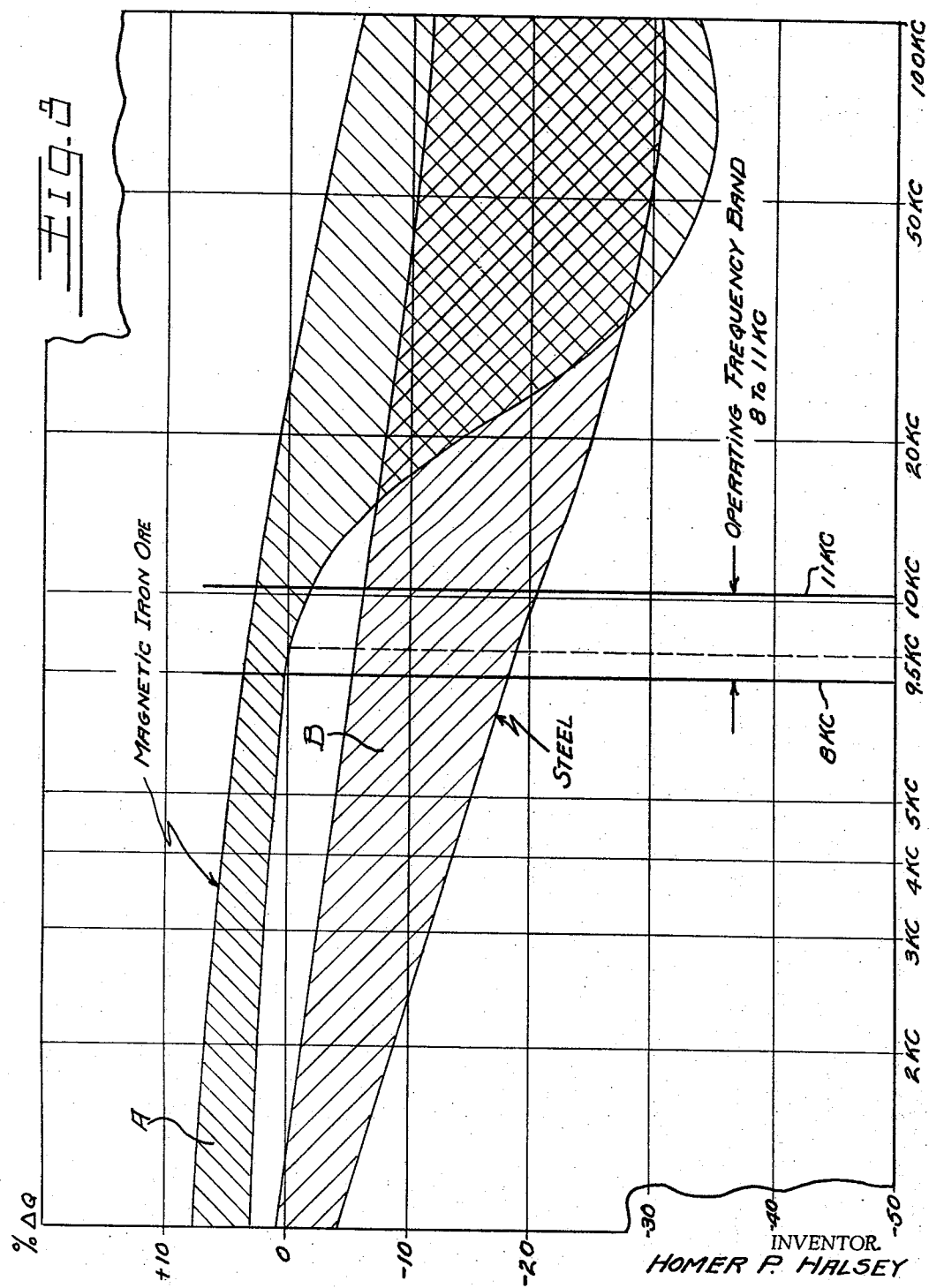

United States Patent Office 3,344,346
Patented Sept. 26, 1967

3,344,346
TRAMP METAL DETECTOR
Homer P. Halsey, Silver Bay, Minn., assignor to Reserve Mining Company, Silver Bay, Minn., a corporation of Minnesota
Continuation of application Ser. No. 322,125, Nov. 7, 1963. This application May 25, 1966, Ser. No. 552,985
4 Claims. (Cl. 324—41)

ABSTRACT OF THE DISCLOSURE

An electronic circuit including an oscillator having a sensing coil energized to provide a magnetic field and disposed adjacent a conveying system so that material carried by said conveying system passes through said magnetic field. The oscillator and the sensing coil are constructed to operate at a frequency such that a magnetic ore burden carried by said conveying system through said magnetic field increases the amplitude of the oscillator output above the value of the amplitude of the output when the conveying system is empty, and a magnetic ore burden having tramp metal therein passing through the magnetic field reduces the amplitude of the output of the oscillator below the value thereof when the conveying system is empty. The oscillator output voltage is rectified and compared to a preselected voltage across a resistive load. The algebraic sum of the predetermined voltage and the voltage output of the amplifier are utilized to bias a control tube so that the tube conducts only when the amplitude of the oscillator output voltage is lowered by the presence of tramp metal in the magnetic field of the sensing coil. The control tube is utilized for a variety of purposes including stopping the conveyor system and providing visual or audio indication of the tramp metal.

---

Figure 1:
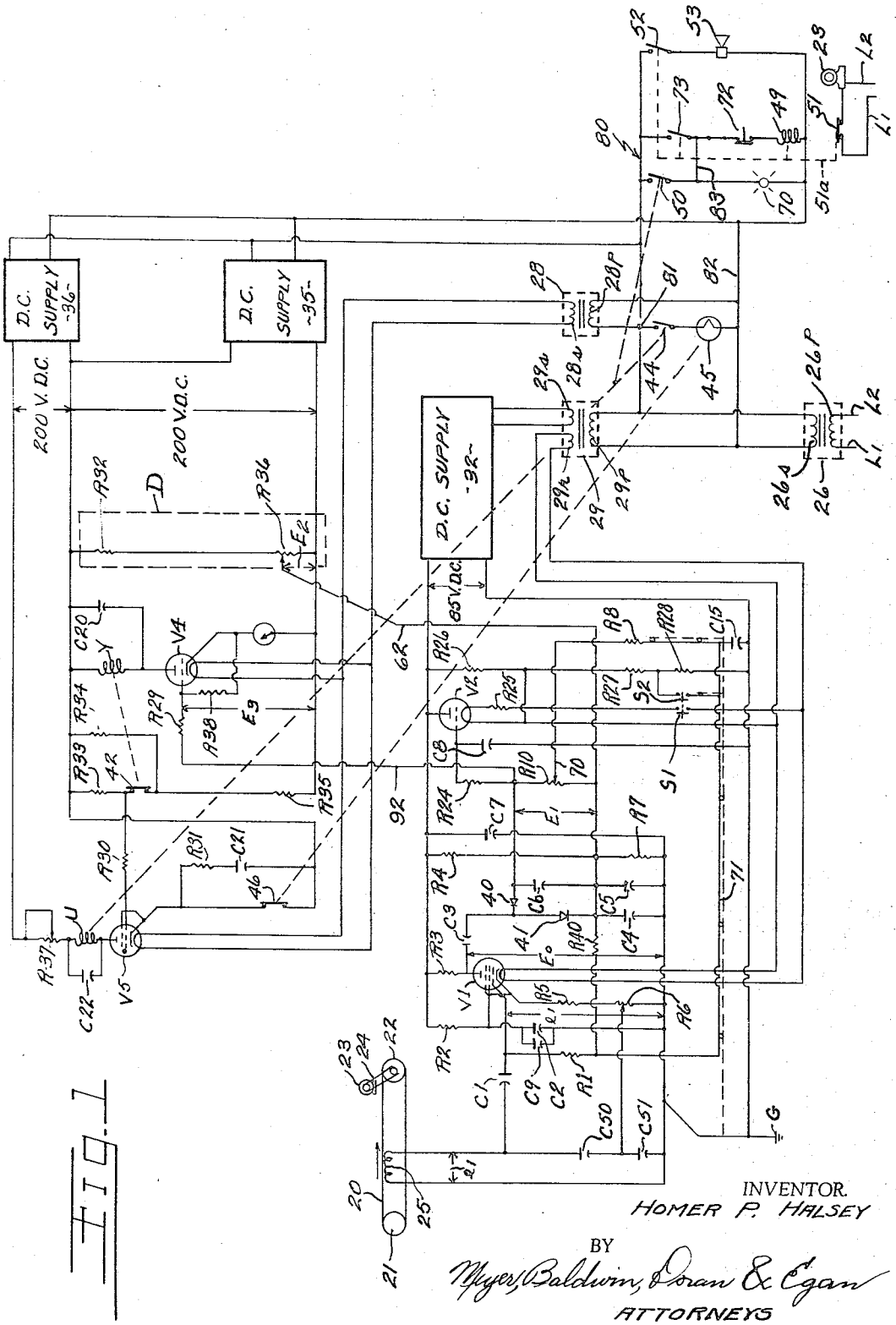

This is a continuation of application Ser. No. 322,125, filed Nov. 7, 1963.

This invention relates to means for detecting the presence of unwanted material or metal, conventionally termed "tramp material" or "tramp metal," in iron ore. Since the detection of metal in non-magnetic material presents no particular problem, means being already available for this purpose, my invention is directed to the detection of tramp metal in ore having a substantial magnetic fraction, such as taconite ore.

In the beneficiation of taconite ore, using this as an exemplification of one use of the invention, the taconite is successively crushed and ground to finer and finer particles, being carried on endless conveyors from one crusher or grinding mill to the next in a continuous flow procedure. The bed of taconite fragments or particles may be up to twelve or more inches in depth. It occasionally happens that a tramp metal body such as a dislodged or broken piece of equipment finds its way into the conveyor burden, and if it is not detected and the conveyor immediately stopped, it may in all likelihood damage subsequent equipment, for instance in succeeding crushing, grinding, or separating stages.

The detector means of the present invention is directed to the detection of unwanted tramp metal.

Because of the magnetic and conductive characteristics of taconite ore, which contains a substantial fraction of magnetite, conventional tramp metal detectors either entirely fail to react to tramp metal therein, or react erratically even when no tramp metal is present, due in part to variations in grade and/or structure of the ore.

An object of the present invention, therefore, is to devise novel and improved means for tramp material detection.

A further object of the invention is to devise a tramp metal detector selective enough to respond to the presence of tramp metal in a moving bed of ore which has a magnetic fraction.

A further object of the invention is to devise a tramp metal detector of electronic character, including circuitry and auxiliary means adapted to be sensitive to and responsive to the passage of tramp metal in an ore bed moving on a conveyor, in combination with means for stopping the conveyor and/or emitting a warning signal, either audible or visual, when the presence of tramp metal is detected.

Another object of the present invention is to provide a tramp metal detector for detecting the passage of tramp metal in a bed of magnetic ore moving along a conveyor, and wherein the detector includes an oscillator operable to sense the passage of a bed of magnetic ore and to provide a control signal in response to the presence of tramp metal in said bed which signal is utilized to initiate stopping the conveyance of said ore bed to permit the removal of said tramp metal.

A further object of the invention is to provide a tramp metal detector of the character defined in the last preceding paragraph, adapted to generate and emit an electric control signal upon the passage or conveyance of tramp metal past sensing means, and wherein the means for generating the signal includes an oscillator operating at a predetermined frequency, the control factors of the detector being so arranged that normal passage of magnetic ore past the sensing means causes an increase in the rectified output from the oscillator, and passage of a fragment of tramp metal past said sensing means causes a decrease in the rectified output from the oscillator. The magnitude of this rectified signal is utilized as the control signal.

Figure 2:
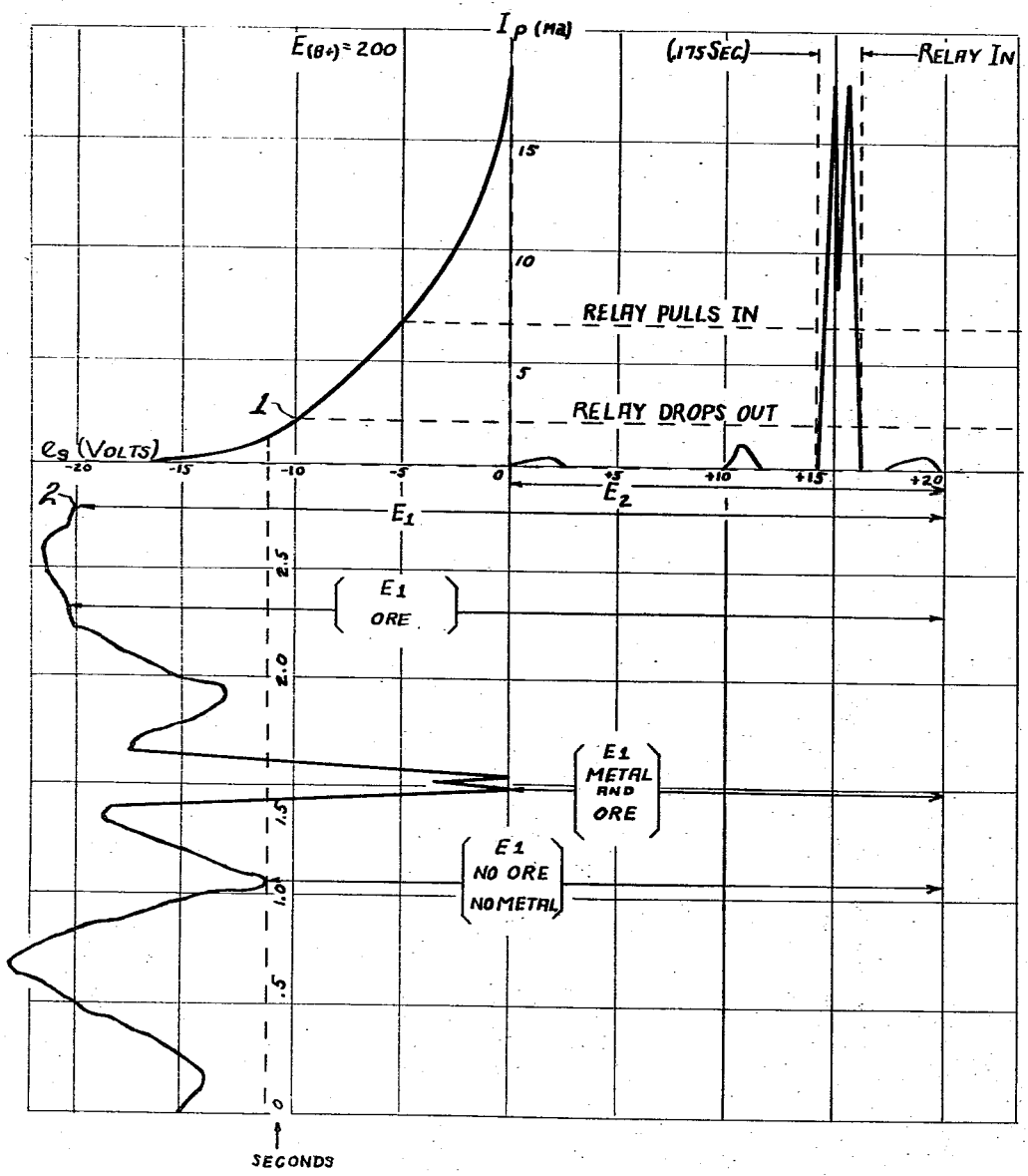

Other objects and advantages will be apparent from a study of the following specification, in conjunction with the accompanying drawings showing one embodiment of the invention, and wherein:

FIG. 1 is a schematic wiring diagram of an electromagnetic detection system incorporating the concepts of the metal detector of the present invention;

FIG. 2 is a diagram illustrating the operating characteristics of the control tube (V4) of the detector; and, FIG. 3 is a graph illustrating the change in the Q of the search coil of the instant detector versus the frequency of operation. It will be noted that at about 9.5 kc. magnetic iron ore gives an increase in Q and steel gives a decrease in Q. If a much higher frequency is employed, then some ores will give a decrease in Q. If a much lower frequency is employed, then the change of Q for steel is reduced.

With reference now directed particularly to FIG. 1, there is herein shown, partly in schematic and partly in diagrammatic form, an electromagnetic detection system which incorporates the detector concepts of the present invention, and which is especially designed in its present embodiment to be placed adjacent an ore-carrying conveyor at a preselected station along the ore benefication process. In this position, the detector system is operable to sense the conveyance of the ore therepast and likewise the presence of any tramp metal in said ore, said system being operable to distinguish between ore and ore plus tramp metal so as to interrupt the conveyance of the latter until the tramp metal is removed.

As is herein shown, the detector system is incorporated for use, merely for purposes of the instant disclosure, with a conveyor 20 of the endless belt type, running around end pulleys 21 and 22, the latter being operated by motor 23 by means of drive belt 24. Conveyors of this type and suitable drive means therefor are conventional and widely used in ore beneficiation processes, and hence need not be shown in greater detail. It is sufficient to indicate here that a bed or burden or ore having a magnetic fraction is being carried on the top flight of the conveyor, immediately above and adjacent to a sensing coil 25 of inductive character which comprises the signal inlet component to the instant detector system.

Iron ore such as for example taconite ore as commonly referred to, has both magnetic and conductive properties which vary as the structure and/or grade of the ore varies. The magnetic property of the ore varies primarily in proportion to the amount of magnetic material in said ore. The conductive property of said ore, however, depends to a great extent upon the structure of the ore. For example, where the magnetic material (Fe) particles in the ore are separated by non-magnetic particles such as silica, the silica acts as an insulator and consequently this type of ore structure has relatively low conductivity. On the other hand, when the Fe particles appear as distinct bands extending through the ore, the conductivity of said ore structure is relatively higher.

As is well known by those skilled in the art, the Q (i.e. inductive efficiency) of an inductive coil is proportional to its inductance and resistance in accordance with the equation $\omega L/R$; where L is in henries and R is in ohms. The Q will vary with variations in the magnetic and conductive characteristics of a material which, by movement of said material in close proximity thereof, cuts the lines of magnetic force developed in the excited coil. As the Q of the coil is hence changed, the voltage $e_1$ likewise changes in responsive proportion.

As aforementioned, this relationship is utilized to provide the controlling function for the detector system of the present invention.

Briefly, this is accomplished in my detector system by utilizing the sensing coil 25 as a part of a resonant input circuit in an oscillator circuit. Said oscillator circuit is utilized to monitor the conveyance of taconite ore as it passes said sensing coil 25, and is operated within a frequency range whereby any change in the iron ore content in the moving ore burden provides an increase in the signal output from the oscillator, and the presence of tramp metal in said moving ore provides a decrease in said oscillator output. The signal output from the oscillator circuit is then rectified and used as a control signal to permit the passage of iron ore, and to interrupt the conveyance of tramp metal in said ore to enable its being removed from the latter.

I have, therefore, provided novel and improved detector means whereby to utilize the aforesaid respectively different characteristics arising from passage of magnetic ore, as distinguished from passage of the same ore carrying a piece of tramp metal such as iron or steel which also has magnetic properties.

As seen in FIG. 1, the coil 25 is indicated as a part of a resonant circuit connected across the grid-cathode circuit of an oscillator identified at V1 the components of which as will later appear, being selected so that the oscillator will operate within a preferred frequency band of approximately 8 to 11 kilocycles.

A suitable direct current supply as indicated at 32, produces a source of D.C. voltage of approximately 85 volts to provide the operational voltage for the oscillator V1.

The oscillator V1 is intended to provide an output voltage $E_0$ with respect to ground which is rectified by diodes 40 and 41 to define a rectified signal $E_1$ which is then applied through conductor 92 and grid resistor 29 to the grid of a control tube V4. Tube V4 in its present form is seen to be a conventional amplifier, connected to D.C. power supply 35 of approximately 200 volts direct current.

A resistive voltage divider D is seen to be connected across the power supply 35, one of the resistances as indicated at R36 being variable to define a positive voltage $E_2$ with respect to the negative terminal of said power supply 35 and which is connected by conductor 62 in series opposition with signal $E_1$, thereby producing an "algebraic sum" effect with respect to $E_1$, the composite effect of $E_1$ plus $E_2$ thus providing a grid bias voltage $E_3$ for the grid of amplifier V4, the effect being represented by the equation $E_3 = (-E_1 + E_2)$; where the $E_1$ rectified output voltage of the oscillator is a negative voltage as applied to the control grid of the tube V4. In this manner, the voltage $E_2$ is used to selectively bias the grid of tube V4 at a predetermined level, the purpose for which will later appear.

A conventional glow tube as identified at V2 is connected across the oscillator V1 and derives its grid bias voltage from the rectified output $E_1$ the latter being such that when the oscillator output is zero said tube V2 glows brilliantly. In this manner tube V2 may be used as a visible indicator in establishing the operation of the oscillator.

As will be understood, the voltage at the variable arm 70 of resistor R10 will likewise vary in proportion to the oscillator output and said voltage is applied through conductor 71 to the control grid of tube V1 to function as an automatic gain control for gradual changes.

The coil of a relay as indicated at Y is connected in series in the plate circuit of tube V4, and has a normally closed contact 42 in series in the grid line of a suitable switching tube such as the thyratron indicated at V5.

A suitable D.C. power supply 36 provides the necessary power to switching tube V5, and dropping resistor R33 connected between supply 35 and the grid of V5 provides the proper magnitude of bias to said grid to normally maintain said tube V5 in a nonconductive state.

The coil of a suitable relay as indicated at U is connected in series in the plate circuit of switching tube V5, said relay having a normally open contact 44 connected in series with a conventional timer device 45 such as of the type commonly referred to as an Amperite timer, said timer device being connected across the secondary winding of conventional constant voltage transformer 26. Transformer 28 is also connected across the secondary winding 26s of the constant voltage transformer 26, the primary 26p of which connects to a suitable source of alternating current energy through primary lines $L_1$ and $L_2$.

The aforementioned D.C. power supply 32 is seen to be connected to secondary winding 29s of transformer 29, a second winding 29r of said secondary being utilized as a filament winding to provide a suitable voltage for the filament of oscillator tube V1. The primary winding 29p of said transformer 29 is seen to be connected across the secondary winding 26s of transformer 26.

The A.C. inputs of D.C. power supplies 35 and 36 are likewise seen to be connected across the secondary winding 26s of transformer 26.

A normally closed contact 46 of timer 45 is connected in series in the cathode circuit of tube V5 in series between the said cathode and the negative terminal of supply 36.

A signal unit as identified in its entirety at 80 is connected by conductors 81 and 82 across the secondary winding 26s of transformer 26, and is preferably provided with a visual signal aid such as light 70 and an audible aid such as horn 53.

The light 70 is connected in series with a normally open contact 50 of the relay U and this series combination is connected, in turn, across conductors 81 and 82.

The horn 53 is likewise connected in series with a normally open contact 52 of a relay 49, this series combination also connecting across said conductors 81 and 82.

The coil of relay 49 is connected in series with a normally closed push button type switch 72 and one of its normally open contacts 73, said resultant series combination likewise connecting across conductors 81 and 82.

A jumper 83 is seen to connect at one end to the junction of contact 73 and switch 72, and at the opposite end to the junction of contact 50 and light 70.

The relay 49 is also provided with a normally closed contact 51 which is connected in series with the power line $L_1$ for the conveyor motor 23.

As seen in FIG. 1, the motor 23 is actually illustrated twice, in its operative position with the conveyor 20 and in conjunction with the signal unit 80. In practice only one motor 23 is used but has been herein separately illustrated in each of its two environments merely to simplify the instant disclosure.

A manual oscillator check switch S of the push button type is seen to have one normally open contact S1 connected in series in the filament of tube V2 and a second normally open contact S2 connected in series in the control grid of V2 between R1 and ground.

As aforementioned, the detector system as just described is intended to function within the frequency range of 8 to 11 kilocycles, and in its present configuration of circuitry, the following list of components will enable the desired operation. The list of components to follow are each identified in the schematic diagram of FIG. 1 by the corresponding reference character.

*Component list*

| | |
|---|---|
| R1—1 meg. | R34—40K. |
| R2—22K. | R35—100K. |
| R3—10K. | R36—20K. |
| R4—470K. | R37—4K. |
| R5—330 ohms | R38—6.8 meg. |
| R6—500 ohms | R40—18 meg. |
| R7—47K. | C1—.01 mf. |
| R8—50 meg. | C2—20 mf. |
| R10—1 meg. | C3—.02 mf. |
| R24—10 meg. | C4—.25 mf. |
| R25—220 ohms | C5—.20 mf. |
| R26—100K. | C6—.1 mf. |
| R27—6.8K. | C7—.02 mf. |
| R28—3.3K. | C8—.02 mf. |
| R29—.68 meg. | C9—.05 mf. |
| R30—1 meg. | C15—8 mf. |
| R31—150 ohms | C20—.25 mf. |
| R32—40K. | C21—.25 mf. |
| R33—40K. | C22—50 mf. |

*Tubes*

| | |
|---|---|
| V1—EF72 | V4—12AU7 |
| V2—DM70 | V5—2D21 |

*Relays*

U—(S–D) 24VDC 50 MA.—480 ohms. 21—4XCX48P TP–DT.
Y—C.P. Clare RP9476G1.
49—G.E. CR120A022AA.

*Sensing coil*
24—4.68 mh.

| Freq. | 6 kc. | 7 kc. | 8 kc. | 9 kc. | 10 kc. | 11 kc. | 12 kc. |
|---|---|---|---|---|---|---|---|
| C50, mf. | .22 | .22 | .1 | .068 | .068 | .047 | .047 |
| C51, mf. | .5 | .25 | .5 | 1.0 | .25 | .5 | .25 |

As heretofore mentioned, the instant detector system may be used at any preselected position along the ore beneficiation process, and merely for purposes of the instant disclosure it is assumed that the system is located at a position therealong where the percentage of Fe in the taconite ore is approximately 20 to 30 percent of the ore burden.

As will be hereinafter apparent, by proper selection of the respective components and their resultant operational characteristics, the detector system may also be located at any pre-selected station along the ore beneficiation process where the percentage of Fe is above or below said selected range.

As is also previously indicated, the preferred operating frequency range for the oscillator V1 is between 8 and 11 kilocycles, and for purposes of the instant disclosure the frequency selected is 9.5 kilocycles as indicated in FIG. 3.

With the sensing coil 25 being a part of a resonant circuit in the grid-cathode circuit of the oscillator V1, the voltage $e_1$ developed across the coil and which is applied to the control grid of said oscillator is a function of the $Q(\omega L)/(R)$ of the coil.

It will be further understood that when the Q of the coil 25 increases the voltage $e_1$ increases, and conversely when the Q decreases the voltage $e_1$ decreases. And, when $e_1$ increases, the oscillator output $E_0$ increases, and conversely when $e_1$ decreases the oscillator output $E_0$ decreases.

The voltage $E_1$ is of such value that when combined with the voltage $E_2$, it is effective to provide a bias voltage $E_3$ for the control tube V4 which is effective to bias said tube V4 to its cutoff condition.

As seen in the operation characeristic curve of FIG. 2 for the particular tube used as the control tube V4 in the instant circuit disclosure (12AU7), this value of voltage $E_1$, approximately −32 volts, is sufficient to provide a grid bias voltage $E_g$ for tube V4 of approximately −12 volts, as indicated at point 1, and an anode current of approximately 1.5 ma. in its cutoff condition.

Thereafter, upon starting the conveyor to move the iron ore past the sensing coil, the magnetic fraction (Fe) of said ore is controlling with respect to the conductive properties of said ore and hence is effective to increase the Q of the sensing coil 25 so that an increase is realized in the voltage output $E_0$ of the oscillator and hence in voltage $E_1$. And, as seen in FIG. 2, an increase in $E_1$ to a magnitude for example as shown at point 2, is effective to further bias the control tube V4 in its cutoff condition.

Consequently, as the volume of material moving past the sensing coil 25 varies from zero to maximum and the percent of the magnetic fraction of said ore varies from zero to approximately 30 percent (representative of the maximum percent of Fe at said station in the ore beneficiation process), said variations in quantity and/or quality effect to provide an increase ($+\Delta Q$) in the Q of the coil 25 and hence an increase in the voltage $E_1$.

Whenever a piece of tramp metal passes the coil 25, as part of the conveyor burden, so as to cut the lines of force surrounding said coil, the conductive properties of said tramp metal are effective to cause a sufficient generation of eddy currents therein which act to lower the effective inductance of the coil which, in turn, decreases the Q of the coil.

When relay Y operates it opens contact 42 in the grid circuit of thyratron V5 which, while previously blocked, then passes plate current to operate relay U. Relay U closes contacts 44 and 50, which energizes Amperite timer 45 and relay 49. When the Amperite timer 45 reaches the end of its preset cycle it opens contact 46 which cuts off thyratron V5. Contact 46 recloses and thyratron V5 is ready for a new cycle whenever contact 42 is again opened by relay Y.

Thyratron V5 derives its grid potential from D.C. supply 35. The grid bias is such that in normal operation thyratron V5 is blocked.

Relay 49 operates contact switch 51 which stops belt motor 23, the interlock control being indicated by a broken line 51a. Switch 51 is normally closed, to maintain the belt motor running and the conveyor in continuous operation, but the sequence of events above described, including passage of the tramp metal, terminates current to motor 23. Relay U closes contact 50 which energizes coil 49 and visual signal device 70. Coil 49 then closes contact 73 which is in parallel with contact 50. When contact 50 opens, coil 49 is energized through contact 73. To de-energize coil 49, reset button 72 has to be actuated. This, in turn, opens contacts 52 and 73 and closes contact 51. Relay 49 may also close switch 52 permitting line current flow to the audible signal device 53, as indicated by broken line extension 51a.

As is obvious from the above description, successful operation of the control depends on the selection of a frequency which gives a slight increase in output voltage for the magnetic ore that has the highest conductivity and gives a decrease in output voltage for tramp metal. As aforementioned, I use an oscillation frequency between about 8,000 cycles and 11,000 cycles, the preferred frequency being about 9,500 cycles. When operated within this range, with the conveyor burden being of the magnetic character stated, there is a critical distinction between the control reaction to the passage of ore on he one hand, and the passage of ore including tramp metal on the other hand.

Restating one of the novel characteristics of the present invention, I use the intentionally developed magnitude of he rectified output of oscillator V1 as a central signal to operate the control tube V4. When there is no ore passing on the conveyor, there is enough normal bias imposed on tube V4 so that the tube passes very little plate current and relay Y does not operate. As magnetic ore moves on the conveyor the rectified voltage increases, which overbiases tube V4 still further. If tramp metal passes the coil the rectified output of tube V1 decreases which cuts the bias on tube V4 low enough to cause the plate relay Y to operate.

Having thus described one embodiment of my detector system in detail, it will be understood that the same is susceptible to various modifications, arrangements and combinations of parts without departing from the inventive concepts thereof as are defined in the claims.

What is claimed is:

1. A detector system for determining the presence of tramp metal in a moving magnetic ore burden comprising:
    (a) an oscillator having a sensing coil energized to provide a magnetic field;
    (b) said sensing coil being adapted to be mounted adjacent the moving ore burden so that the ore burden passes through the magnetic field produced by said sensing coil;
    (c) said oscillator and said sensing coil operating at a frequency such that said oscillator provides an output signal having a first amplitude with no ore burden in the magnetic field, said output signal having an amplitude greater than said first amplitude with the ore burden in said magnetic field, and said output signal having an amplitude less than said first amplitude with the ore burden and tramp metal in said magnetic field; and
    (d) electrical circuit means connected to receive said oscillator output signal, said electrical circuit means responding to said output signal when the amplitude is less than a predetermined amplitude and providing an indication for each response.

2. A detector system as set forth in claim 1 wherein the frequency of the oscillator is in the range of approximately six kilocycles to twelve kilocycles.

3. A detector system as set forth in claim 1 having in addition means connected to receive a signal from said electrical circuit means and responsive thereto for interrupting the movement of the ore burden to permit the removal of the tramp metal.

4. A detector system for determining the presence of tramp metal in a moving magnetic ore burden comprising:
    (a) an oscillator having an input circuit including an inductive sensing coil energized to provide a magnetic field;
    (b) said sensing coil being adapted to be mounted adjacent the moving ore burden so that the ore burden passes through the magnetic field produced by said sensing coil;
    (c) said oscillator and said sensing coil operating such that said oscillator provides an output signal having a first amplitude with no ore burden in the magnetic field, the amplitude of the output signal increasing with the ore burden in said magnetic field, and the amplitude of the output signal decreasing with the ore burden and tramp metal in said magnetic field;
    (d) reference means providing a signal having a predetermined amplitude;
    (e) electrical circuit means connected to receive said oscillator output signal and connected to said reference means, said electrical circuit means containing circuitry for comparing the amplitude of said oscillator output signal to the amplitude of said reference means signal and containing further circuitry for providing an output in response to said compared signals when the amplitude of said oscillator output signal is less than said predetermined amplitude; and
    (f) means responsive to the output of said further circuitry of said electrical circuit means for providing an indication each time an output is received therefrom.

References Cited

UNITED STATES PATENTS

| 2,844,781 | 7/1958 | Adelman et al. | 324—41 |
| 3,209,245 | 9/1965 | Hauge | 324—41 |

RUDOLPH V. ROLINEC, *Primary Examiner.*

WALTER L. CARLSON, *Examiner.*

R. J. CORCORAN, *Assistant Examiner.*